United States Patent
Golgiri et al.

(10) Patent No.: US 11,112,786 B2
(45) Date of Patent: Sep. 7, 2021

(54) REMOTE TRAILER MANEUVER-ASSIST

(71) Applicant: Ford Global Technologies, LLC, Dearborn, MI (US)

(72) Inventors: Hamid M. Golgiri, Livonia, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 16/437,566

(22) Filed: Jun. 11, 2019

(65) Prior Publication Data

US 2020/0393825 A1    Dec. 17, 2020

(51) Int. Cl.

| | |
|---|---|
| *G05D 1/00* | (2006.01) |
| *B60W 30/06* | (2006.01) |
| *B62D 15/02* | (2006.01) |
| *G05D 1/02* | (2020.01) |
| *B60W 10/18* | (2012.01) |
| *B60W 10/20* | (2006.01) |
| *B60W 10/04* | (2006.01) |

(52) U.S. Cl.
CPC .......... *G05D 1/0016* (2013.01); *B60W 30/06* (2013.01); *B62D 15/0285* (2013.01); *G05D 1/0033* (2013.01); *G05D 1/0038* (2013.01); *B60W 10/04* (2013.01); *B60W 10/18* (2013.01); *B60W 10/20* (2013.01); *B60W 2420/42* (2013.01); *B60W 2420/52* (2013.01); *G05D 1/0246* (2013.01); *G05D 1/0257* (2013.01)

(58) Field of Classification Search
CPC .. G05D 1/0016; G05D 1/0033; G05D 1/0038; G05D 1/0257; G05D 1/0246; B60W 30/06; B60W 2420/52; B60W 2420/42; B62D 15/0285

See application file for complete search history.

(56) References Cited

U.S. PATENT DOCUMENTS

| | | | |
|---|---|---|---|
| 6,371,829 B1 | 4/2002 | Kato et al. | |
| 8,909,426 B2 | 12/2014 | Rhode et al. | |
| 9,108,598 B2 | 8/2015 | Headley | |
| 2007/0236475 A1* | 10/2007 | Wherry | G06F 3/04883 345/173 |
| 2013/0109272 A1 | 5/2013 | Rindlisbacher | |
| 2017/0259850 A1* | 9/2017 | Yamashita | G08G 1/168 |
| 2017/0293306 A1* | 10/2017 | Riefe | G05D 1/0044 |
| 2018/0299885 A1* | 10/2018 | Herzog | B62D 13/06 |
| 2020/0142395 A1* | 5/2020 | Delbari | B60K 35/00 |

FOREIGN PATENT DOCUMENTS

EP    2947532 A1    11/2015

OTHER PUBLICATIONS

ZF Lenksysteme Press Information, "Smart Trailer Parking Reversing with Trailer via Smartphone", PT Trailer en IAA, Sep. 2013 (4 pages).

\* cited by examiner

*Primary Examiner* — Abby Y Lin
*Assistant Examiner* — Renee LaRose
(74) *Attorney, Agent, or Firm* — Frank Lollo; Bejin Bieneman PLC

(57) ABSTRACT

A method includes detecting a continuous rotary input on a touchscreen of a portable device in communication with a vehicle, determining a steering angle and a steering direction based on a radius and a rotational direction of the continuous rotary input, and actuating a steering component of the vehicle based on the steering angle and the steering direction.

19 Claims, 6 Drawing Sheets

REMOTE TRAILER MANEUVER-ASSIST

BACKGROUND

A vehicle may be equipped with a vehicle maneuvering feature, e.g., parking assist, braking assist, etc., in which at least one of the vehicle propulsion, braking, and steering are controlled by a computer. The computer may operate the vehicle based on inputs provided by a user, e.g., via an interface in the vehicle. The computer may display information from the vehicle maneuvering feature to the user, e.g., via the interface.

DETAILED DESCRIPTION

Figure 1:
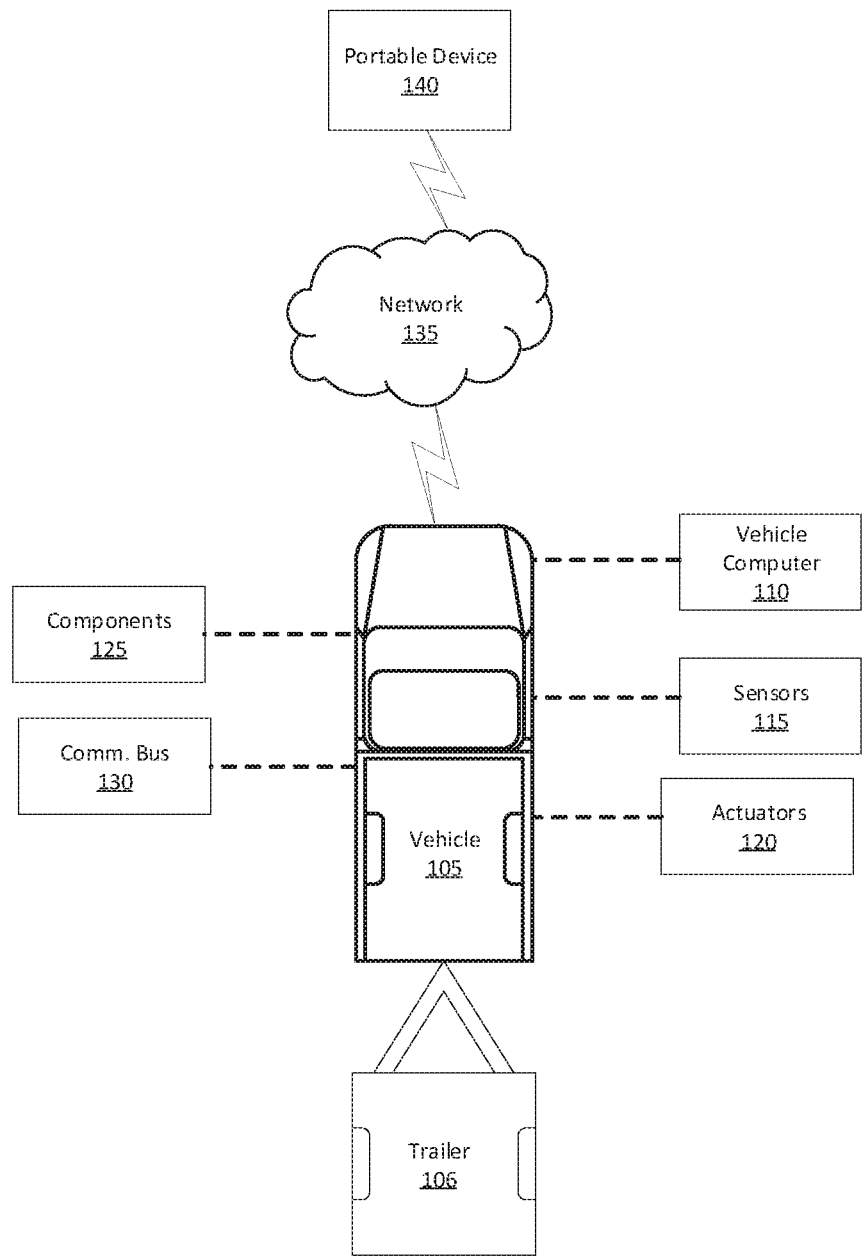
FIG. 1 is a diagram illustrating example remote trailer maneuver assist system.

A method includes detecting a continuous rotary input on a touchscreen of a portable device in communication with a vehicle, determining a steering angle and a steering direction based on a radius and a rotational direction of the continuous rotary input, and actuating a steering component of the vehicle based on the steering angle and the steering direction.

The method can include, upon detecting the vehicle is stopped, displaying at least one of a gear selector and a speed selector on the touchscreen.

The method can include actuating a propulsion component of the vehicle based on detecting a speed of the continuous rotary input above a threshold.

The method can include operating the vehicle at a vehicle speed based on the speed of the continuous rotary input.

The method can include operating the vehicle at a vehicle speed below an upper speed limit.

The method can include operating the vehicle at a vehicle speed below a lower speed limit based on detecting a trailer angle above a threshold.

The method can include actuating a brake component of the vehicle based on detecting the speed of the continuous rotary input below the threshold.

The speed of the continuous rotary input can be determined by one of an angular velocity and a tangential velocity.

The method can include operating the vehicle along a straight path based on one of detecting the steering angle below a radius threshold, detecting a button pressed on the portable device, and detecting a continuous non-rotary input.

The method can include displaying an indicator on the touchscreen based on the steering angle and the steering direction of the continuous rotary input.

A system can comprise a compute include a processor and a memory, the memory storing instructions executable by the processor to detect a continuous rotary input on a touchscreen of a portable device in communication with a vehicle, determine a steering angle and a steering direction based on a radius and a rotational direction of the continuous rotary input, and actuate a steering component of the vehicle based on the steering angle and the steering direction.

The instructions can further include instructions to, upon detecting the vehicle is stopped, display at least one of a gear selector and a speed selector on the touchscreen.

The instructions can further include instructions to actuate a propulsion component of the vehicle based on detecting a speed of the continuous rotary input above a threshold.

The instructions can further include instructions to operate the vehicle at a vehicle speed based on the speed of the continuous rotary input.

The instructions can further include instructions to operate the vehicle at a vehicle speed below an upper speed limit.

The instructions can further include instructions to operate the vehicle at a vehicle speed below a lower speed limit based on detecting a trailer angle above a threshold.

The instructions can further include instructions to actuate a brake component of the vehicle based on detecting the speed of the continuous rotary input below the threshold.

The speed of the continuous rotary input can be determined by one of an angular velocity and a tangential velocity.

The instructions can further include instructions to operate the vehicle along a straight path based on one of detecting the steering angle below a radius threshold, detecting a button pressed on the portable device, and detecting a continuous non-rotary input.

The instructions can further include instructions to display an indicator on the touchscreen based on the steering angle and the steering direction of the continuous rotary input.

FIG. 1 is a block diagram of an example system 100, including a vehicle computer 110 programmed to detect a continuous rotary input on a touchscreen 145 of a portable device 140 in communication with a vehicle 105, to determine a steering angle and a steering direction based on a radius and a rotational direction of the continuous rotary input, and to actuate a steering component 125 of the vehicle 105 based on the steering angle and the steering direction. The vehicle 105 may include a computer 110 programmed to execute one or more vehicle maneuvering assists that may be selected by a user, e.g., a parallel-parking assist, trailer maneuver assist, braking assist, etc. When the vehicle maneuvering assist is selected, the vehicle computer 110 may control one or more vehicle components 125 of the vehicle 105 to assist the user, e.g., in performing a selected maneuver. For example, during trailer maneuver assist, the vehicle determines steering and counter-steering angles while traveling in reverse to direct a trailer 106 along a curved path. Advantageously, the portable device 140 can allow the user to operate the trailer maneuver assist remotely, i.e., outside the vehicle 105, which allows the user to move around the vehicle 105 to avoid visibility constraints or limitations, and/or more reliably or accurately direct movement of the vehicle 105.

A vehicle 105 includes the vehicle computer 110, sensors 115, actuators 120 to actuate various vehicle components 125, and a vehicle communications bus 130. Via a network 135, the communications bus 130 allows the vehicle computer 110 to communicate with the portable device 140.

A trailer 106 is coupled to the vehicle 105, e.g., via a hitch, to facilitate transportation of objects from one location to another location. For example, the trailer 106 can be utilized to transport objects when storage areas within the vehicle 105 (e.g., trunks, flatbeds, passenger cabins, etc.) are unable to contain the objects. As used herein, a "trailer"

refers to an object (e.g., a travel trailer, a recreational trailer, a disabled vehicle, a mobile home, etc.) that is attached, e.g., hitched, to the vehicle 105 such that the object will be towed behind the vehicle 105 when the vehicle 105 is moving in a forward direction.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, a human machine interface (HMI), etc. Alternatively, or additionally, in cases where the vehicle computer 110 actually comprises a plurality of devices, the vehicle 105 communication network may be used for communications between devices represented as the vehicle computer 110 in this disclosure. Further, as mentioned below, various controllers and/or sensors 115 may provide data to the vehicle computer 110 via the vehicle 105 communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 includes a trailer sensor 115 to monitor the position of the trailer 106 relative to the vehicle 105. For example, the trailer sensor 115 detects when the trailer 106 is coupled to a hitch of the vehicle 105. In such examples, the trailer sensor 115 may be a capacitive sensor, a piezoelectric sensor, a magnetoelastic sensor, and/or any other sensor configured to detect a coupling of the trailer 106 to the hitch. Additionally, or alternatively, the trailer sensor 115 detects a trailer angle formed between the trailer 106 and the vehicle 105 when the trailer 106 is coupled to the hitch. The trailer angle may be the relative angle between a longitudinal axis of the vehicle 105 and a longitudinal axis of the trailer 106.

The vehicle 105 actuators 120 are implemented via circuits, chips, or other electronic and or mechanical components that can actuate various vehicle subsystems in accordance with appropriate control signals as is known. The actuators 120 may be used to control vehicle components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of vehicle components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The steering component 125 is operable in one of a left-turn position, a right-turn position, or a straight position. The vehicle computer 110 may be programmed to operate a steering controller of the vehicle 105, e.g., an ECU, to operate the steering component 125 in one of the positions. For example, the vehicle computer 110 may actuate the steering component 125 based on the continuous rotary input from the portable device 140. The vehicle computer 110 can actuate the steering controller to operate the steering component 125 in the straight position to propel the vehicle 105 straight, e.g., along a longitudinal axis of the vehicle 105. The vehicle computer 110 can actuate the steering control to operate the steering component 125 in the left-turn position to turn the vehicle 105 to the left, e.g., relative to the longitudinal axis of the vehicle 105. The vehicle computer 110 can actuate the steering control to operate the steering component 125 in the right-turn position to turn the vehicle 105 to the right, e.g., relative to the longitudinal axis of the vehicle 105.

The transmission component 125 is engageable in one of a drive gear or a reverse gear. The computer 110 may be programmed to actuate a transmission controller of the vehicle 105, e.g., an ECU, to engage the transmission component 125 in one of the gears. For example, the vehicle computer 110 may actuate the transmission component 125 based on a gear selector 155 displayed on the portable device

140 (as discussed further below). The vehicle computer 110 can actuate the transmission controller to engage the transmission component 125 in the drive gear to propel the vehicle 105 forward. The vehicle computer 110 can actuate the transmission controller to engage the transmission component 125 in the reverse gear to propel the vehicle 105 backwards, i.e., in reverse.

The vehicle computer 110 can, for example, communicate with the portable device 140 through wireless communications, e.g., Bluetooth®, Wi-Fi®, etc. The user can be external to the vehicle 105, i.e., not physically touching the vehicle 105, or in physical contact with the vehicle 105, e.g., sitting in a passenger cabin of the vehicle 105.

To prevent an intruder computer from controlling the vehicle 105, the vehicle computer 110 may be programmed to authenticate a portable device 140 that is activated to control the vehicle 105 operation. The vehicle computer 110 may be programmed to perform an authentication based on a key, e.g., a combination of numbers and/or characters, received from the portable device 140 upon communicating with the vehicle 105. In another example, the vehicle computer 110 may be programmed to receive, from the portable device 140, a request including an access code, e.g., a secret code known to certain parties such as vehicle distributors, e.g., dealers, for activating a vehicle 105 non-autonomous mode. The vehicle computer 110 may activate the vehicle 105 non-autonomous mode upon determining that the received access code matches an expected access code, e.g., based on stored information in the vehicle computer 110.

In one example, if the vehicle computer 110 determines that the received access code matches an expected access code, then the vehicle computer 110 may activate a vehicle 105 non-autonomous mode. For example, the vehicle computer 110 may be programmed to control the vehicle 105 operation based on commands received from the portable device 140. In another example, the vehicle computer 110 may additionally authenticate the portable device 140 after the access code is verified. Alternatively, the vehicle computer 110 may be programmed to first authenticate the portable device 140 and then proceed to verify the access code before activating a vehicle 105 non-autonomous mode.

Authentication of a digital communication or message as discussed herein means implementing a scheme for determining an authenticity (or lack thereof) of the communication or message, e.g., a message from the portable device 140 to the vehicle computer 110 indicating a steering input. Various known techniques such as an authentication signature (or digital signature) may be used for authentication. The vehicle computer 110 can conclude that the message was created by a known sender, e.g., a known portable device 140, upon detecting a valid authentication signature included in a received message.

For example, the portable device 140 may be programmed to perform the authentication by sending a message including an authentication signature to the vehicle computer 110. The authentication signature may be based on data, known to both parties, e.g., an identifier of a sender, a local time, etc., and/or an encryption/decryption key. Thus, a receiver can verify the authentication signature based on the encryption key, the decryption key, and/or the known data such as the portable device 140 identifier.

The vehicle computer 110 may be programmed to receive a message sent from the portable device 140 and authenticate the portable device 140 based on the authentication signature. In one example, the vehicle computer 110 may be programmed to authenticate the portable device 140 based on data stored in the vehicle computer 110 or otherwise accessible by the vehicle computer 110. For example, the vehicle computer 110 may authenticate the portable device 140 by determining whether the authentication signature is included in a list of valid authentication signatures stored in the vehicle computer 110 or a memory accessible by the vehicle computer 110. In another example, the vehicle computer 110 may determine an expected signature for the respective portable device 140, e.g., a combination of an identifier of the known portable device 140 and current time and verify whether the authentication signature of the received message includes the expected signature. In another example, the vehicle computer 110 may determine the expected signature based on a result of an operation, e.g., multiplication, of a portable device 140 identifier, current time, etc. In other words, the vehicle computer 110 may be aware of how the portable device 140 determines its authentication signature.

A user can provide a rotary input to the touchscreen 145 of the portable device 140. A rotary input is input, e.g., from a user's finger, specifying a curved line extending a curvilinear distance on the touchscreen 145. For example, the user can press the touchscreen 145 with a finger and move the finger substantially circularly around the touchscreen 145, e.g., in a rotary input region 165 (as discussed below). The rotary input can be one of a substantially continuous rotary input or a discontinuous rotary input based on a speed of the rotary input. The touchscreen 145 stops receiving a rotary input, whether continuous or discontinuous, when the user removes the finger from, i.e., releases or stops touching, the rotary input region 165 of the touchscreen 145.

A continuous rotary input is input of a curved line that has a (curvilinear) distance increasing with time, and a speed of the rotary input is, and remains, above a threshold, or the speed of the rotary input is nonzero but is below the threshold for less than a predetermined time. That is, the predetermined time is established to allow the user to briefly slow the rotary input, or be inconsistent in a speed of the rotary input, without preventing the rotary input from being recognized as continuous.

On the other hand, if the user slows the rotary input below a threshold speed, or stops it altogether even while maintaining a finger on the touchscreen 145, then the rotary input is recognized as discontinuous. A discontinuous rotary input is input of a curved line that has a constant distance for the predetermined time. The rotary input is a discontinuous rotary input when the speed of the rotary input is below the threshold speed for more than the predetermined time. The predetermined time is determined to detect substantially continuous rotary input despite the speed of the rotary input momentarily dropping below the threshold, e.g., when a user changes a direction of the rotary input. The predetermined time can be determined through empirical testing and observation of user behavior.

When the rotary input is recognized as continuous, the vehicle computer 110 is programmed to control one or more vehicle components 125 to move the vehicle 105 and the trailer 106. Conversely, when the rotary input is recognized as discontinuous, the vehicle computer 110 is programmed to control one or more vehicle components 125 to stop the vehicle 105 and the trailer 106. One of the vehicle computer 110 or the portable device 140 can determine whether the rotary input is a substantially continuous rotary input (as discussed below).

The vehicle computer 110 can control the steering of the vehicle 105 and the trailer 106 along a simplified path based on a substantially continuous rotary input. For example, the vehicle computer 110 can determine a steering input, which includes a steering angle and a steering direction, based on the substantially continuous rotary input to steer the vehicle 105 and the trailer 106 along the path. In other words, the substantially continuous rotary input indicates a path along which to steer the vehicle 105 and the trailer 106. In this situation, the user inputs the substantially continuous rotary input, i.e., specifying the desired path, to the portable device 140 and the vehicle computer 110 can translate the substantially continuous rotary input into the steering commands for the steering component 125 to steer and counter-steer both the vehicle 105 and the trailer 106 along the path. That is, the vehicle computer 110 can actuate the steering component 125 to operate between the right-turn position, the straight position, and the left-turn position to steer the vehicle 105 and the trailer 106 along the path based on the substantially continuous rotary input. The path may include a curvature threshold. The curvature threshold is a maximum curvature path, i.e., smallest radius, along which the vehicle computer 110 can steer the vehicle 105 and the trailer 106. The curvature threshold is determined based on the gear of the transmission component 125, a trailer angle, a wheelbase, a distance between a hitch ball and a trailer axle, and a distance between the hitch ball a rear axle of the vehicle 105. The curvature threshold corresponds to the largest radius of the substantially continuous rotary input the portable device 140 can detect, e.g., based on dimension and/or resolution constraints of the touchscreen 145.

The steering direction may be determined relative to a longitudinal axis A of the touchscreen 145. The portable device 140 can, for example, transmit a rotational direction of the substantially continuous rotary input to the vehicle computer 110. In this example, the vehicle computer 110 determines the steering direction based on a rotational direction of the substantially continuous rotary input. Alternatively, the portable device 140 can determine the steering direction based on a rotational direction of the substantially continuous rotary input. In these circumstances, the portable device 140 can transmit the steering direction to the vehicle computer 110. For example, the substantially continuous rotary input may rotate in one of a clockwise direction or a counterclockwise direction relative a longitudinal axis A of the touchscreen 145. When the substantially continuous rotary input rotates in the clockwise direction (see FIG. 2A), the vehicle computer 110 may actuate the steering component 125 to steer the vehicle 105 and the trailer 106 along a path to the right. Conversely, when the substantially continuous rotary input rotates in the counterclockwise direction, the vehicle computer 110 may actuate the steering component 125 to steer the vehicle 105 and the trailer 106 along a path to the left.

Additionally, the vehicle computer 110 can, for example, determine the steering angle based on the radius of the substantially continuous rotational input. That is, the vehicle computer 110 determines an amount to steer the vehicle 105 and the trailer 106 relative to a straight path. The radius of the substantially continuous rotary input is determined from the longitudinal axis A of the touchscreen 145. The portable device 140 can, for example, transmit the radius of the substantially continuous rotary input to the vehicle computer 110. In these circumstances, the vehicle computer 110 determines the steering angle based on the radius of the substantially continuous rotary input. Alternatively, the portable device 140 can determine the steering angle based on a radius of the substantially continuous rotary input. In these circumstances, the portable device 140 can transmit the steering angle to the vehicle computer 110. The vehicle computer 110 then can actuate the steering component 125 to increase the steering angle (i.e., turn further away from the straight position) when the radius of the substantially continuous rotary input increases, and to decrease the steering angle (i.e., turn towards the straight position) when the radius of substantially the continuous rotary input decreases. When the steering angle is increased, a turning radius of the vehicle 105 is decreased, which increases a curvature of the path of the vehicle 105 and the trailer 106. When the steering angle is decreased, a turning radius of the vehicle 105 is increased, which decreases a curvature of the path of the vehicle 105 and the trailer 106.

The vehicle computer 110 may actuate the steering component 125 to operate in the straight position based on the radius of the substantially continuous rotary input. The vehicle computer 110 compares the radius of the substantially continuous rotary input to a threshold. The threshold is a minimum radius of the substantially continuous rotary input at which the vehicle computer 110 actuates the steering controller to turn the steering component 125, e.g., to one of the left-turn position or the right-turn position. The threshold is determined from the longitudinal axis A of the touchscreen 145. The radius of the substantially continuous rotary input is less than the threshold when the substantially continuous rotary input is provided on the touchscreen 145 within a circle defined by the threshold radius, and the radius of the substantially continuous rotary input is greater than the threshold when the substantially continuous rotary input is provided on the touchscreen 145 outside the circle defined by the threshold radius. When the radius of the substantially continuous rotary input is less than the threshold, the vehicle computer 110 actuates the steering component 125 to operate in the straight position (see FIG. 2B). Conversely, when the radius of the substantially continuous rotary input is greater than the threshold, the vehicle computer 110 actuates the steering component 125 to turn to one of the left-turn position or the right-turn position based on the steering input, i.e., the steering direction and the steering angle (see FIG. 2A).

Alternatively, the vehicle computer 110 may actuate the steering component 125 to operate in the straight position based on detecting one of a continuous non-rotary input and detecting a button pressed on the portable device 140. For example, a user may input a continuous non-rotary input to the portable device 140, e.g., a zigzag line, a figure eight, etc. The portable device 140 can transmit the continuous non-rotary input to the vehicle computer 110. In these circumstances, the vehicle computer 110 is programmed to actuate the steering component 125 to operate in the straight position. As another example, the user may press a button on the portable device 140. The button may be a physical button, e.g., a volume button on a smart phone, or a virtual button, e.g., displayed on the touchscreen 145 of the portable device 140. When the button is pressed, the portable device 140 can transmit a message to the vehicle computer 110. In these circumstances, the vehicle computer 110 is programmed to actuate the steering component 125 to operate in the straight position.

In addition, the vehicle computer 110 may be configured for communicating via a vehicle-to-vehicle communication bus 130 or interface with devices outside of the vehicle 105, e.g., through a vehicle-to-vehicle (V2V) or vehicle-to-infrastructure (V2X) wireless communications to another vehicle, and/or to the portable device 140 (typically via direct radio frequency communications). The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with the portable device 140. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The portable device 140 includes a supporting or enclosing structure, such as a housing or other support structure on or in which sensors, as well as a communications module, computer, and input means can be housed, mounted, stored, and/or contained and powered, etc. The portable device 140 is moveable by a user to multiple locations separate from the vehicle 105. Although not shown for ease of illustration, the portable device 140 also includes a power source such as a battery.

The portable device 140 can determine a speed of the rotary input, e.g., a speed at which a user's finger moves relative to the touchscreen 145. The speed of the rotary input is determined by one of an angular velocity and a tangential velocity of a finger of the user. The portable device 140 can include a sensor that detects the speed of the rotary input, i.e., the speed of the finger of the user relative to the touchscreen 145. For example, the sensor can detect a first position and a second position of the user's finger on the touchscreen 145 and associated time stamps that the user's finger is in the first position and the second position, respectively. The angular velocity is determined by the velocity of the finger of the user along a path of rotary input. In other words, the sensor can determine an angle about a center of the touchscreen 145 the user's finger moved along the touchscreen 145 from the first position to the second position and a time duration of the movement from the first position to the second position. The tangential velocity is determined by the velocity of the finger of the user tangent to the path of the rotary input. In other words, the sensor can determine an arc length about the center of the touchscreen 145 the user's finger moved along the touchscreen 145 from the first position to the second position and a time duration of the movement from the first position to the second position. The portable device 140 may determine the speed of the rotary input, e.g., within a predetermined region on the touchscreen 145, at one or more points on the touchscreen 145, etc.

The system 100 can determine whether the rotary input is a substantially continuous rotary input or a discontinuous rotary input. Upon the portable device 140 detecting the rotary input, one of the portable device 140 and the vehicle computer 110 can compare the speed of the rotary input to the threshold. The threshold is a minimum speed of the rotary input at which the portable device 140 is permitted to communicate with the vehicle computer 110 to actuate vehicle components 125 to move the vehicle 105. The threshold can be one of an angular velocity or a tangential velocity and can be determined based on empirical testing to determine the minimum speed at which users provide rotary input to control the vehicle 105. The portable device 140 can, for example, transmit the speed of the rotary input, as discussed above, to the vehicle computer 110, and the vehicle computer 110 can compare the speed of the rotary input to the threshold. Alternatively, the portable device 140 can compare the speed of the rotary input to the threshold and transmit a message to the vehicle computer 110 identifying a substantially continuous rotary input or a discontinuous rotary input. When the speed of the rotary input is above the threshold, one of the portable device 140 or the vehicle computer 110 determines the rotary input is a substantially continuous rotary input, and the vehicle computer 110 is programmed to actuate vehicle components 125, e.g., the steering component 125, the propulsion component 125, etc., to move the vehicle 105 based on the substantially continuous rotary input.

One of the portable device 140 and the vehicle computer 110 can activate a timer that measures an elapsed time that the speed of the rotary input is below the threshold. When the speed of the rotary input is below the threshold for less than a predetermined time, i.e., prior to the expiration of the timer, one of the portable device 140 or the vehicle computer 110 determines that the rotary input is a substantially continuous rotary input. In these circumstances, the vehicle computer 110 is programmed to actuate vehicle components 125, e.g., the steering component 125, the propulsion component 125, etc., to move the vehicle 105 based on the substantially continuous rotary input. Conversely, when the speed of the rotary input is below the threshold for the predetermined time, i.e., when the timer expires, one of the portable device 140 or the vehicle computer 110 determines the rotary input is a discontinuous rotary input. In these circumstances, the vehicle computer 110 is programmed to actuate the vehicle components 125, e.g., the brake component 125, to stop the vehicle 105. The vehicle computer 110 controls a vehicle speed of the vehicle 105 and the trailer 106, e.g., based on at least one of a speed of the substantially continuous rotary input and a trailer angle. The vehicle computer 110 can actuate the propulsion component 125 to operate the vehicle 105 at a vehicle speed based on the speed of the substantially continuous rotary input. For example, the vehicle computer 110 actuates the propulsion component to increase the vehicle speed when the speed of the substantially continuous rotary input increases, and to decrease the vehicle speed when the speed of the substantially continuous rotary input decreases. That is, when the speed of the substantially continuous rotary input is increased, the vehicle computer 110 actuates the propulsion component 125 to increase the vehicle speed, i.e., propel the vehicle 105 faster.

Additionally, or alternatively, the vehicle computer 110 can operate the vehicle 105 at a vehicle speed based on the trailer angle. The vehicle computer 110 can compare the trailer angle to a threshold. The threshold may be a maximum trailer angle at which the vehicle computer 110 operates the vehicle 105 at a vehicle speed above a lower speed limit. For example, when the trailer angle is above the threshold, the vehicle computer 110 operates the vehicle 105 at a vehicle speed at or below the lower speed limit. When the trailer angle is below the threshold, the vehicle computer 110 operates the vehicle 105 at a vehicle speed at or below an upper speed limit. The upper speed limit is greater than the lower speed limit. In other words, the vehicle computer 110 can operate the vehicle 105 at a faster vehicle speed when the trailer angle is below the threshold as compared to when the trailer angle is above the threshold.

Figure 2A:
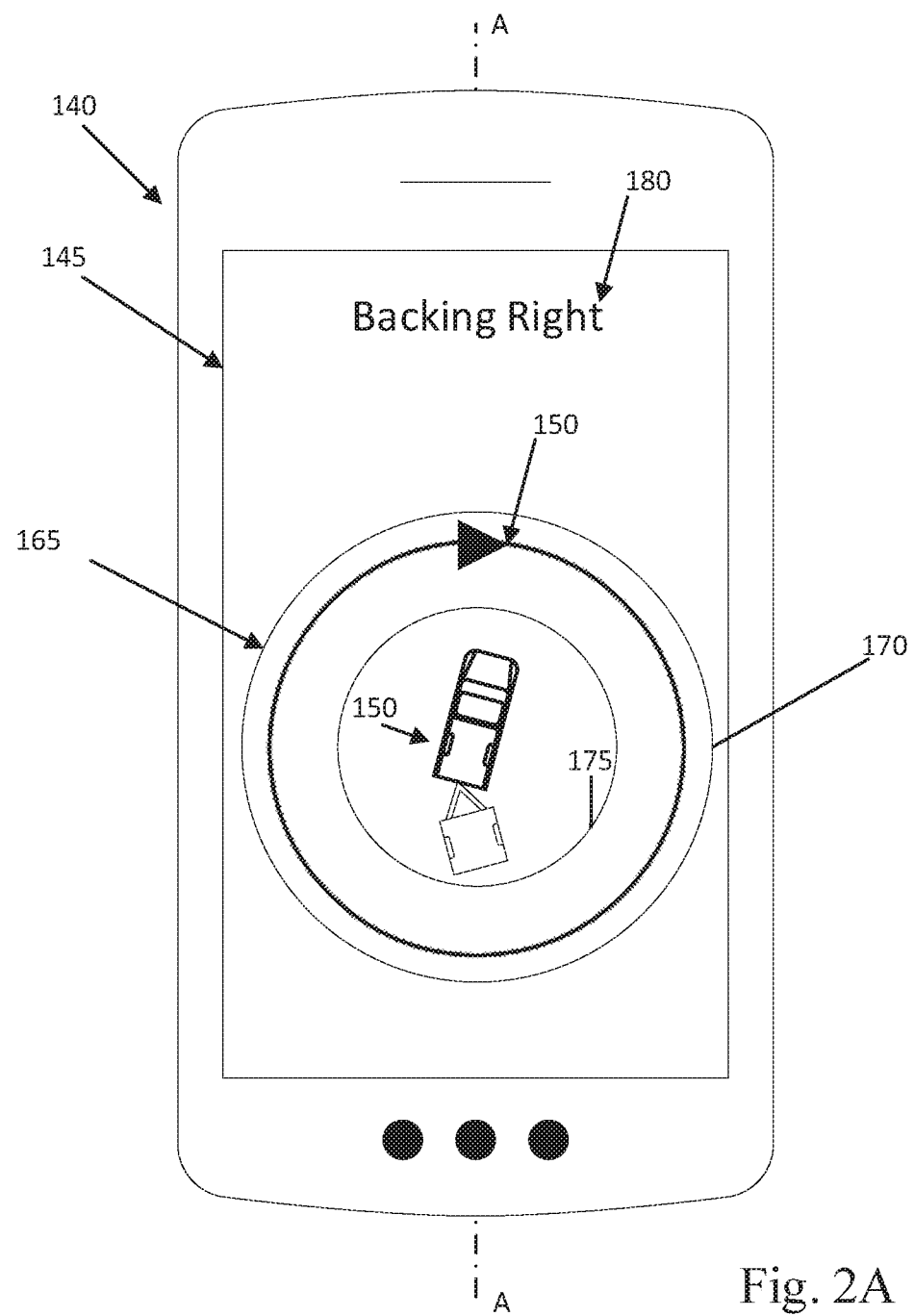
FIG. 2A is a diagram illustrating an example touchscreen of a portable device.
Figure 2B:
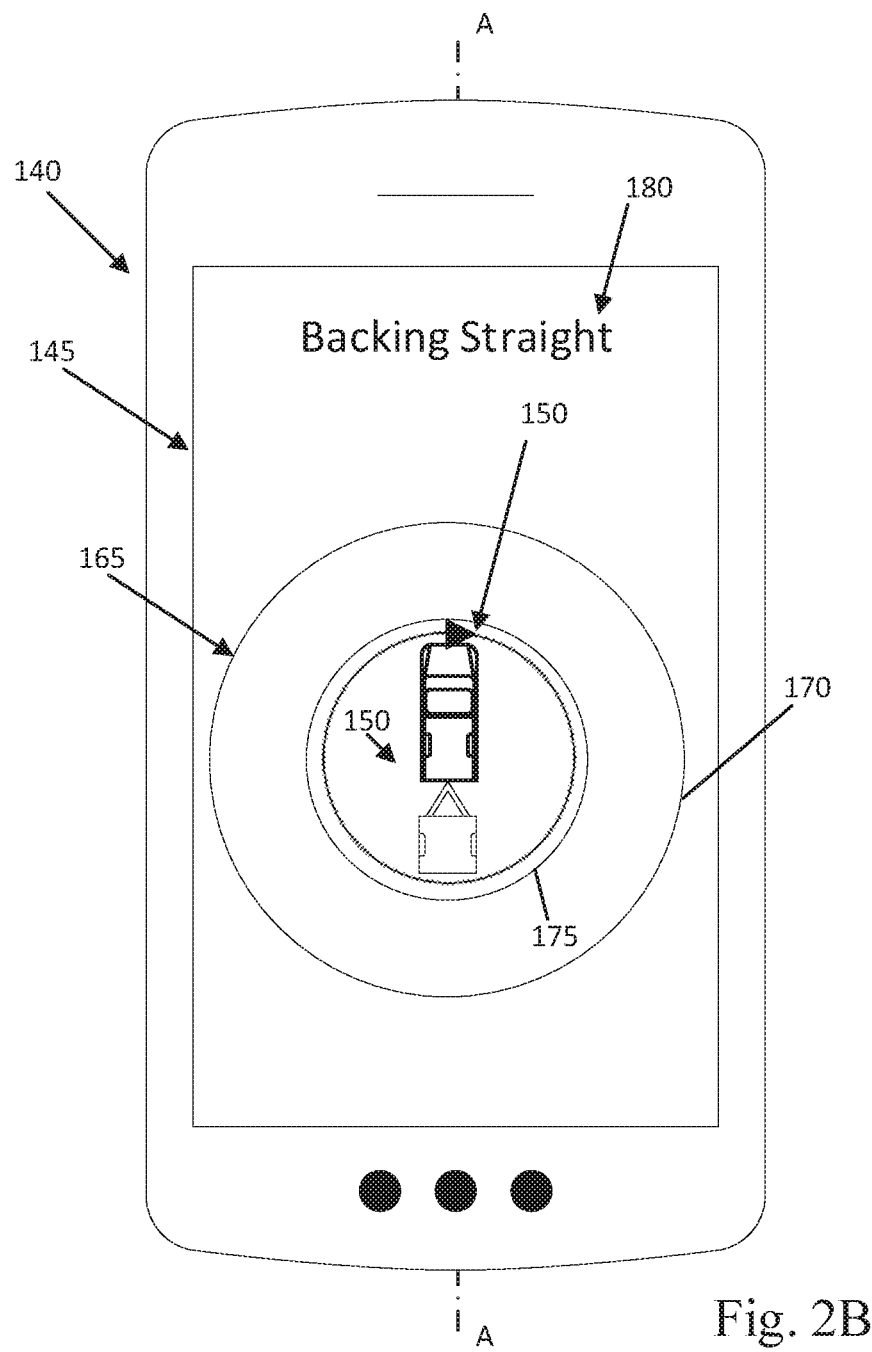
FIG. 2B is a diagram illustrating another example touchscreen of the portable device.

Turning to FIG. 2A, the portable device 140 can be any one of a variety of computers that can be used while carried by a person, e.g., a smartphone, a tablet, a personal digital assistant, a smart watch, etc. The portable device 140 may communicate with the vehicle communications bus 130 via wireless communication. For example, the portable device 140 can be communicatively coupled to the vehicle communications bus 130 with wireless technologies such as described above. In other words, the portable device 140 can communicate with the vehicle communications bus 130, e.g., using Bluetooth®, Bluetooth® Low Energy (BLE), IEEE 802.11, vehicle-to-vehicle (V2V) such as Dedicated Short Range Communications (DSRC), etc.

The portable device 140 includes a processor programmed to run one or more applications stored in a memory. An "application" is programming stored in the memory that includes instructions that the processor executes to perform an operation. For example, the application can be a remote trailer maneuver assist (ReTMA) application that includes instructions to transmit data from the portable device 140 to the vehicle computer 110 and to receive data from the vehicle computer 110. That is, the ReTMA application includes instructions for the portable device 140 to communicate with the vehicle computer 110. Example communications by the ReTMA application includes, e.g., transmission of steering input from the portable device 140 to the vehicle computer 110, transmission of vehicle 105 operating parameters (i.e., transmission gear, speed, trailer angle, etc.) from the vehicle computer 110 to the portable device 140, etc. As used herein, "remote trailer maneuver assist" refers to a trailer maneuver assist system that enables a user to control operation of a vehicle from a remote location, e.g., via a portable device 140, relative to the vehicle 105.

The portable device 140 may include various input means. For example, the input means may be buttons, sliders, knobs, graphical images, etc. displayed on the touchscreen 145. In other words, the input means may be virtually presented on the touchscreen 145 and respond to inputs provided by the user touching the virtual input means.

The input means can include a rotary input region 165, a gear selector 155, and a speed selector 160. The rotary input region 165 is displayed on the touchscreen 145 (see FIGS. 2A-2C). The rotary input region 165 is engageable by a user, e.g., pressing a finger within the rotary input region 165, to provide the substantially continuous rotary input, e.g., moving the finger around the rotary input region 165 above the speed threshold. That is, the user provides a substantially continuous rotary input within the rotary input region 165 to control the direction the vehicle 105 travels, e.g., straight, turn left, or turn right. The user provides substantially continuous rotary input in one of the clockwise direction or the counterclockwise direction. When the user provides rotary input at a speed above the threshold (i.e., the substantially continuous rotary input), the portable device 140 transmits signals to the vehicle computer 110. The vehicle computer 110 is programmed to actuate the steering component 125 to turn the vehicle left or right, respectively. When the speed of the rotary input is below the threshold (e.g., the user removes the finger from the touchscreen 145), the portable device 140 transmits a signal to the vehicle computer 110, and the vehicle computer 110 is programmed to actuate a brake component 125, e.g., to stop the vehicle 105.

The rotary input region 165 may include an outer boundary 170. The portable device 140 may detect the substantially continuous rotary input only within the outer boundary 170 of the rotary input region. The outer boundary 170 may be displayed on the touchscreen 145 (see FIGS. 2A-2C). Additionally, the rotary input region 165 may include an inner boundary 175, which corresponds to the radius threshold of the substantially continuous rotary input. The inner boundary 175 may be displayed on the touchscreen 145 (see FIGS. 2A-2C), e.g., to provide an indicator to the user of a location to provide the substantially continuous rotary input on the touchscreen 145 to control the vehicle 105 on a straight path. In these circumstances, the vehicle computer 110 may be programmed to actuate the steering component 125 in one of the left-turn position or the right-turn position upon the portable device 140 detecting a substantially continuous rotary input between the outer boundary 170 of the rotary input region and the inner boundary 175 of the rotary input region 165. Conversely, the vehicle computer 110 may be programmed to actuate the steering component 125 in the straight position upon the portable device 140 detecting a substantially continuous rotary input within the inner boundary 175 of the rotary input region 165.

Figure 2C:
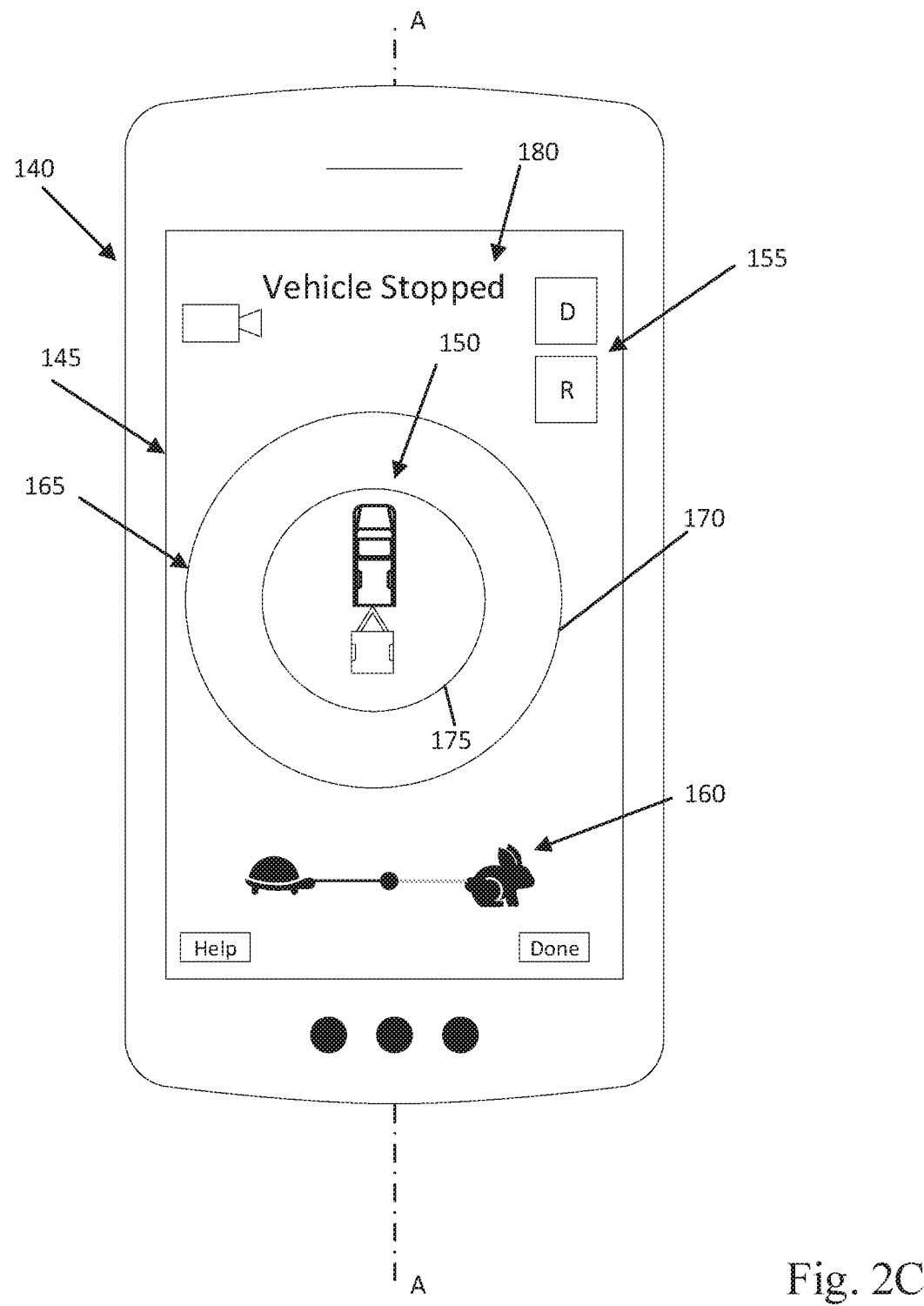
FIG. 2C is a diagram illustrating another example touchscreen of the portable device.

The gear selector 155 is displayed on the touchscreen 145 when the vehicle 105 is stopped (see FIG. 2C). In other words, the user can engage with the gear selector 155 only when the vehicle 105 is stationary. That is, the portable device 140 displays the gear selector 155 on the touchscreen 145 only upon the vehicle computer 110 determining the vehicle 105 is stopped and transmitting a signal to the portable device 140. For example, the gear selector 155 can include a forward button and a reverse button. When the user presses the reverse button, the vehicle computer 110 receives signals from the portable device 140 and actuates the transmission component 125 to engage in the reverse gear, i.e., to propel the vehicle 105 backwards. Conversely, when the user presses the forward button, the vehicle computer 110 receives signals from the portable device 140 and actuates the transmission component 125 to engage in the drive gear, i.e., to propel the vehicle 105 forward. As another example, the gear selector 155 can include a knob selectively rotatable between a forward position and a reverse position, a graphical image of the vehicle 105 and the trailer 106 each being selectively engageable (e.g., selecting the graphical image of the vehicle 105 corresponds to the drive gear of the transmission component 125 and selecting the graphical image of the trailer corresponds to the reverse gear of the transmission component 125), etc. The vehicle computer 110 may be programmed to actuate the transmission component 125 in one of the drive gear and the reverse gear based on the gear selector 155.

The speed selector 160 is displayed on the touchscreen 145 when the vehicle 105 is stopped (see FIG. 2C). In other words, the user can engage with the speed selector 160 only when the vehicle 105 is stationary. That is, the portable device 140 displays the speed selector 160 on the touchscreen 145 only upon the vehicle computer 110 determining the vehicle 105 is stopped and transmitting a signal to the portable device 140. For example, the speed selector 160 can include a slider moveable across a range from a slow setting to a fast setting. The slow setting may represent a minimum vehicle speed at which the vehicle computer 110 can operate the vehicle 105 while towing the trailer 106, and the fast setting may represent a maximum vehicle speed at which the vehicle computer 110 can operate the vehicle 105 while towing the trailer 106. That is, the position of the slider within the range corresponds to a vehicle speed between the minimum speed and the maximum speed at which the vehicle computer 110 can operate the vehicle 105 while towing the trailer 106. The slow setting corresponds to a slower vehicle speed than the fast setting. The fast setting may be based on the trailer angle. For example, when the trailer angle is below the threshold, the fast setting may represent a vehicle speed at or below the upper speed limit. Conversely, when the trailer angle is above the threshold, the fast setting may represent a vehicle speed at or below the lower speed limit. As another example, the speed selector 160 can include a dial selectively rotatable across a range from the fast setting to the slow setting, two buttons selectively engageable and representing one of the fast setting or the slow setting, respectively, two graphical images selectively engageable and representing one of the fast setting or the slow setting, respectively, etc. The vehicle computer 110 is programmed to actuate the propulsion component based on the speed selector 160 and the trailer angle.

The portable device 140 can detect the radius of the substantially continuous rotary input, as discussed above, in the rotary input region 165. For example, the portable device 140 can include a sensor that may detect that the finger of the user is pressing the touchscreen 145 and may detect the path traveled by the finger as the finger moves around the touchscreen 145, e.g., in the rotary input region 165. The portable device 140 can transmit the radius of the substantially continuous rotary input to the vehicle computer 110. When the substantially continuous rotary input is provided below the radius threshold, the vehicle computer 110 can be programmed to actuate the steering component 125 to move the vehicle 105 along a substantially straight path. When the substantially continuous rotary input is provided above the radius threshold, the vehicle computer 110 is programmed to actuate the steering component 125 to turn the vehicle 105, e.g., to the left or to the right, based on the substantially continuous rotary input, e.g., the steering direction. In this situation, the vehicle computer 110 is programmed to actuate the steering component 125 to decrease the steering angle when the radius of the substantially continuous rotary input increases, and to increase the steering angle when the radius of the substantially continuous rotary input decreases. That is, the steering angle may have linear relationship with the radius of the substantially continuous rotary input. Alternatively, the portable device 140 can determine the steering input based on the radius of the substantially continuous rotary input and transmit the steering input to the vehicle computer 110.

The portable device 140 can detect the speed of the substantially continuous rotary input, as discussed above, in the rotary input region 165. For example, the sensor of the portable device 140 may detect the speed of the finger of the user, e.g., one of an angular velocity and a tangential velocity, as the finger moves around the rotary input region 165. The portable device 140 can transmit the speed of the substantially continuous rotary input to the vehicle computer 110. When the speed of the substantially continuous rotary input is above the input speed threshold, the vehicle computer 110 is programmed to actuate the propulsion component 125 to operate the vehicle 105 at a vehicle speed, e.g., based on the speed selector 160 and the trailer angle. When the speed of the substantially continuous rotary input is below the input speed threshold, the vehicle computer 110 is programmed to actuate a brake component 125, e.g., to stop the vehicle 105.

The portable device 140 may display an indicator 150 on the touchscreen 145 based on the steering input, e.g., the steering angle and the steering direction. The indicator 150 may be, e.g., a graphical image, an alphanumeric string, etc. that corresponds to the steering input. The indicator 150 may be displayed within the rotary input region 165 (see FIGS. 2A and 2B). Alternatively, the indicator 150 may be displayed external to the rotary input region 165 on the touchscreen 145. For example, the indicator 150 may be at least one of an arrowhead or a ring. The ring may be displayed in the rotary input region 165 that indicates the radius, i.e., path, of the substantially continuous rotary input. The arrowhead may be displayed in the rotary input region 165, e.g., on the ring, and point in the steering direction. In these circumstances, the arrowhead may have a size, e.g., an area, a perimeter, etc., representing the steering angle. In other words, the size of the arrowhead may be scaled based on the steering angle. That is, when the radius of the substantially continuous rotary input is increased, the size of the arrowhead is increased, and when the radius of the substantially continuous rotary input is decreased, the size of the arrowhead is decreased. Additionally, or alternatively, the indicator 150 may include a graphical image of the vehicle 105 and the trailer 106. In these circumstances, the graphical images may be displayed such that the graphical images represent the orientation of the trailer 106 with respect to the vehicle 105, i.e., the trailer angle. For example, the portable device 140 may receive signals from the vehicle computer 110 indicating the trailer angle and adjust the graphical images accordingly. That is, the indicator 150 may display a virtual representation of the trailer angle determined by the trailer sensor 115. As yet another example, the indicator 150 may be an alphanumeric string of characters displaying a message. The message could identify one or more of, e.g., the trailer angle, the steering direction, etc.

The portable device 140 can be programmed to display a message 180 on the touchscreen 145. The message 180 may be a string of characters. The message 180 may indicate one or more of a longitudinal direction of vehicle 105 movement, a transmission gear, a steering direction, etc. For example, the message 180 may indicate that the vehicle computer 110 is actuating the transmission component 125 to operate in one of the drive gear or the reverse gear (see FIGS. 2A and 2B). Additionally, or alternatively, the message 180 may indicate that the vehicle computer 110 is actuating the steering component 125 to operate the in one of the straight position (see FIG. 2B), the left-turn position, or the right-turn position (see FIG. 2A).

The portable device 140 may be programmed, e.g., via software and/or firmware, to receive user inputs, e.g., the gear selector 155, the speed selector 160, the substantially continuous rotary input in the rotary input region 165, etc. In response to a user input, the portable device 140 may transmit data, representing the user input, to the vehicle computer 110. The vehicle computer 110 may generate commands based on the user input to actuate the steering controller, e.g., to operate the steering component 125 in one of the positions based on the substantially continuous rotary input, to operate the propulsion component 125 based on the speed selector 160 and/or the trailer angle, to operate the transmission component 125 based on the gear selector 155, etc.

Figure 3:
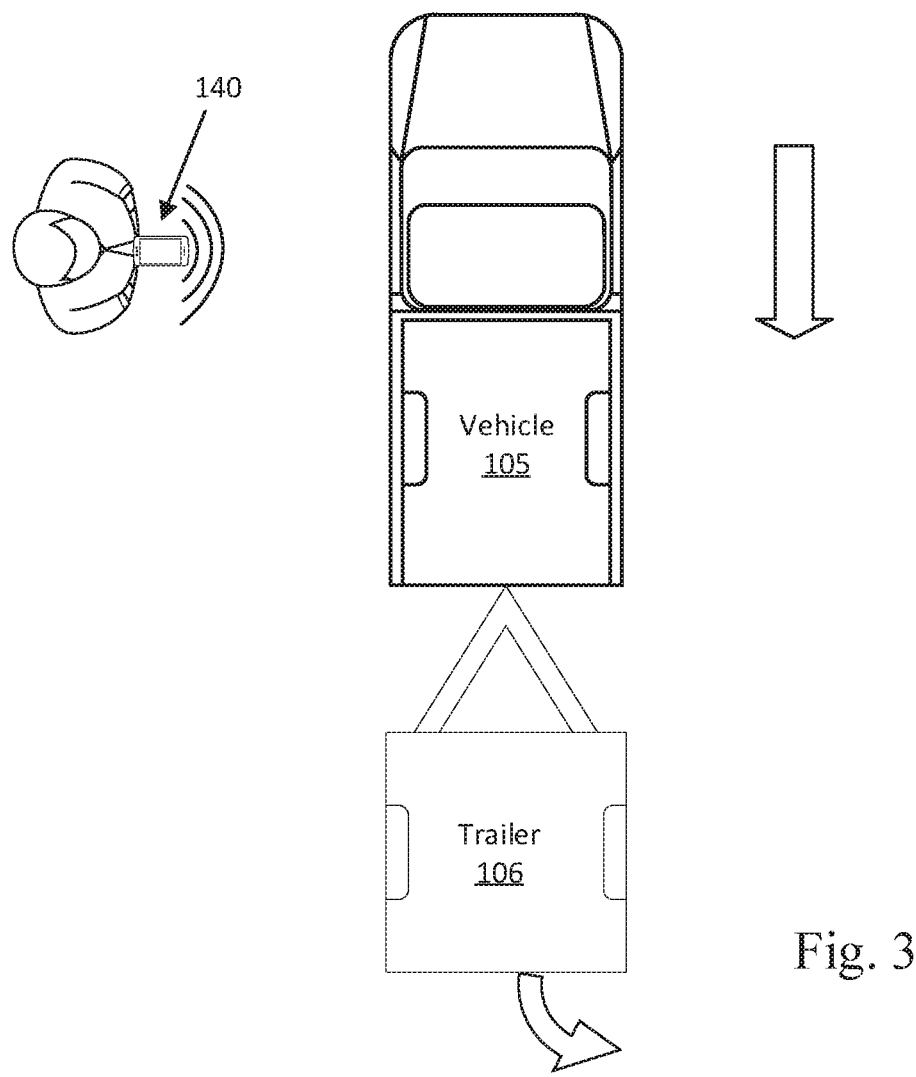
FIG. 3 is a diagram illustrating an example remote trailer maneuver assist application.

Turning to FIG. 3, the portable device 140 can be provided to control the vehicle 105 during operation while maneuvering a trailer 106. For example, the vehicle 105 could be maneuvering a trailer 106 to park the trailer at a location, e.g., a parking lot, a garage, a loading dock, a boat launch, etc.

FIG. 3 is a block diagram illustrating the portable device 140 controlling the vehicle 105 while the vehicle 105 is towing a trailer 106. At some points during operation, obstacles may be present around the vehicle 105. At such times, the user may not be able to view the obstacles while sitting in the cabin of the vehicle 105. As such, the user may control the vehicle 105 with the portable device 140 so the user may move around the vehicle 105 to view potential obstacles.

The vehicle computer 110 is programmed to detect the portable device 140 is activated, e.g., a ReTMA application is operating on the portable device 140. Once the vehicle computer 110 detects that the portable device 140 is activated, the vehicle computer 110 authenticates the portable device, as set forth above, to prevent an unauthorized control of the vehicle 105. Once the portable device is authenticated, the vehicle computer 110 may detect the substantially continuous rotary input. For example, the portable device 140 can transmit data, e.g., via Bluetooth, Wi-Fi, or some other wireless protocol, to the vehicle computer 110 specifying the substantially continuous rotary input.

A user can activate the portable device 140 to control the vehicle 105, e.g., by opening a ReTMA application on the portable device 140. After activating the portable device 140, the vehicle computer 110 authenticates the portable device, and then operates the vehicle 105 based on the substantially continuous rotary input. The user can direct the vehicle 105 using the portable device 140. In other words, the portable device 140 can receive user input and transmit data representing the user input to the vehicle computer 110. For example, when the user provides a substantially continuous rotary input, the portable device 140 transmits a signal to the vehicle computer 110. Upon receiving the signal, the vehicle computer 110 is programmed to actuate vehicle components 125 based on the substantially continuous rotary input. For example, the vehicle computer 110 is programmed to actuate the steering controller to operate the steering component 125 in one of the straight position, the left-turn position, or the right-turn position, respectively. In this situation, the user can control the vehicle 105 to maneuver the trailer 106.

Additionally, the user can select the transmission gear and a vehicle speed prior to the vehicle computer 110 operating the vehicle 105. In this situation, the portable device 140 transmits a signal to the vehicle computer 110, which can actuate the transmission controller to engage the transmission component 125 in one of the drive gear or the reverse gear based on the gear selector 155. Also, the portable device 140 transmits a signal to the vehicle computer 110, which can actuate the actuate the propulsion component 125 to operate the vehicle at a vehicle speed based on the speed selector 160. The vehicle computer 110 is programmed to adjust the vehicle speed during operation of the vehicle 105 based on the trailer angle.

The user can deactivate the portable device 140 once the trailer 106 is maneuvered to the desired location, e.g., by closing a ReTMA application on the portable device 140. The vehicle computer 110 is programmed to actuate the brake component 125 to stop the vehicle 105 when the portable device 140 is deactivated.

Figure 4:
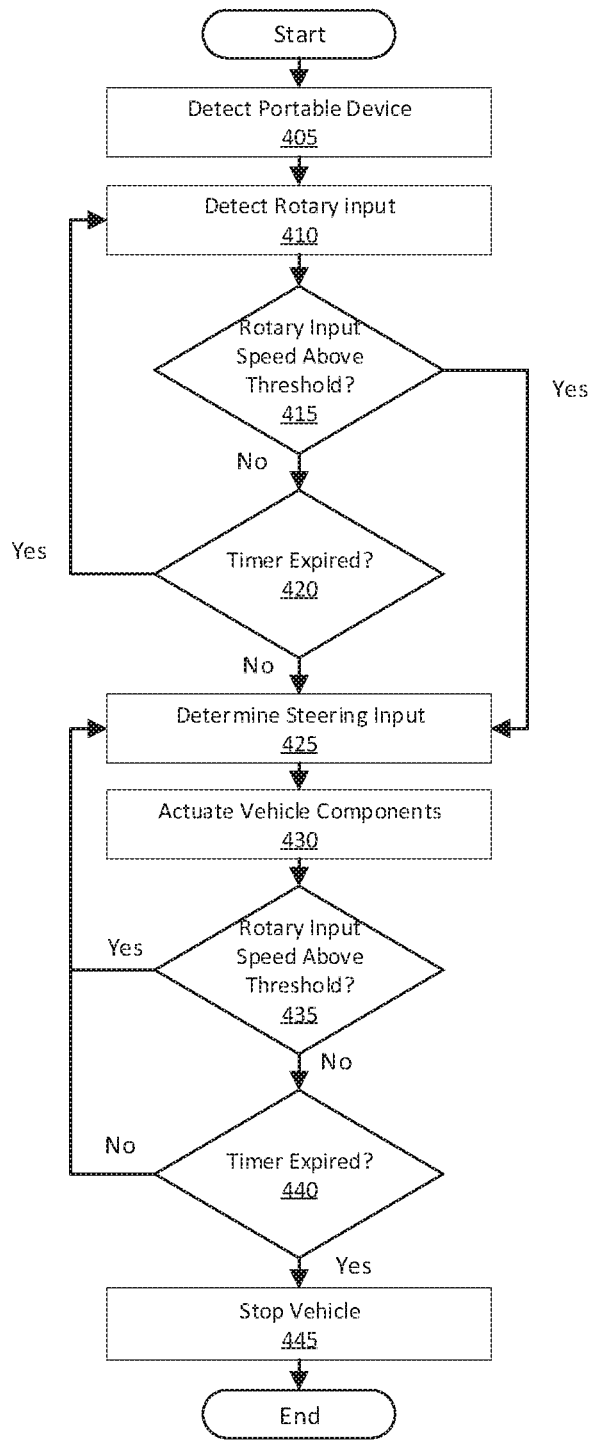
FIG. 4 is a flow chart of an exemplary process to maneuver the vehicle and a trailer with the portable device.

FIG. 4 illustrates an exemplary process 400 that can be implemented in the vehicle computer 110 to receive the substantially continuous rotary input from the portable device 140 and to operate the vehicle 105 based on the substantially continuous rotary input.

The process 400 begins in a block 405, in which the vehicle computer 110 detects the portable device 140. For example, the portable device 140 can transmit data including commands to (and receive data from) the vehicle computer 110, e.g., through wireless communications, when the portable device 140 is activated. In other words, the activation of the portable device 140 initiates communication between the portable device 140 and the vehicle computer 110, e.g., sending of a "handshake" request in which the portable device 140 transmits a wireless message to the vehicle computer 110 asking for a response and initiation of an authentication protocol; the vehicle computer 110 can respond acknowledging the activation or initiation message from the portable device 140, whereupon the vehicle computer 110 can authenticate the portable device 140 according to conventional authentication mechanisms such as exchange of security keys that can be used in conjunction with a stored private key, user input of a password, or the like, biometric authentication of a user of the portable device 140, etc.

The portable device 140 is typically activated when the user opens a ReTMA application on the portable device 140. When the ReTMA application is operating on the portable device 140, the vehicle computer 110 can authenticate the portable device 140 to prevent an intruder computer from operating the vehicle 105. Once the portable device 140 is activated and authenticated, the vehicle computer 110 can control the vehicle based on a steering input transmitted from the portable device 140. If the portable device 140 is activated and authenticated, then the process 400 continues to a block 410. Otherwise, the process 400 remains in the block 405.

Next, in the block 410, the vehicle computer 110 detects a rotary input provided to the portable device 140. For example, the rotary input region 165 of the touchscreen 145 can receive the rotary input from the user's finger. In these circumstances, the portable device 140 can determine the rotary input, e.g., the radius and the rotational direction. The portable device 140 can transmit the rotary input to the vehicle computer 110, and the vehicle computer 110 can actuate vehicle components 125 based on the rotary input, e.g., the radius and the rotational direction. Additionally, the portable device 140 can determine a speed of the rotary input. In these circumstances, the portable device 140 can transmit the speed of the rotary input to the vehicle computer 110.

Next, in a decision block 415, the vehicle computer 110 determines whether the speed of the rotary input is above a threshold. For example, the vehicle computer 110 compares the speed of the rotary input to the threshold. When the speed of the rotary input is above the threshold, the vehicle computer 110 determines the rotary input is a substantially continuous rotary input. When the speed of the rotary input is below the threshold, the vehicle computer 110 determines the rotary input is a discontinuous rotary input. Alternatively, the portable device 140 can compare the speed of the rotary input to the threshold and transmit a message to the vehicle computer 110 identifying whether the rotary input is a substantially continuous rotary input or a discontinuous rotary input. If the speed of the rotary input is above the threshold, then the process 400 continues in a block 425. Otherwise, the process 400 continues in a decision block 420.

In the decision block 420, the vehicle computer 110 determines whether a timer has expired. The timer, as explained above, is activated when the speed of the rotary input is below the threshold. The timer begins when the speed of the rotary input decreases below the threshold. The vehicle computer 110 can determine the speed of the rotary input increases above the threshold prior to the expiration of the timer. In these circumstances, the user can increase the speed of the rotary input prior to the expiration of the timer. When the speed of the rotary input increases above the threshold prior to the expiration of the timer, the vehicle computer 110 determines the rotary input is a substantially continuous rotary input. If the speed of the rotary input remains below the threshold when the timer expires, then the vehicle computer 110 determines the rotary input is a discontinuous rotary input. Alternatively, the timer can be in the portable device 140. For example, a processor of the portable device 140 can be programmed to determine that the speed of the rotary input increases above the threshold prior to the expiration of the timer. If the speed of the rotary input increases above the threshold prior to the expiration of the timer, then the process 400 continues in the block 425. Otherwise, the process 400 returns to the block 410.

In the block 425, the vehicle computer 110 determines the steering input. For example, the vehicle computer 110 determines the steering direction and the steering angle based on a substantially continuous rotary input. The vehicle computer 110 determines the steering direction based on the rotational direction of the substantially continuous rotary input. For example, the user may provide a rotary input in one of the clockwise direction, i.e., to the right, or the counterclockwise direction, i.e., to the left, relative to the longitudinal axis A of the touchscreen 145. In these circumstances, the portable device 140 transmits the rotational direction of the substantially continuous rotary input to the vehicle computer 110. Alternatively, the portable device 140 can determine the steering direction based on the rotational direction of the substantially continuous rotary input and transmit the steering direction to the vehicle computer 110.

Additionally, the vehicle computer 110 determines the steering angle based on a radius of the substantially continuous rotary input. For example, the steering angle is zero when the radius of the substantially continuous rotary input is below a threshold. When the radius of the substantially continuous rotary input increases, the steering angle increases, and when the radius of the substantially continuous rotary input decreases, the steering angle decreases. The user may provide a rotary input having a radius extending from the longitudinal axis A of the touchscreen 145. In these circumstances, the portable device 140 transmits the radius of the substantially continuous rotary input to the vehicle computer 110. Alternatively, the portable device 140 can determine the steering angle based on the radius of the substantially continuous rotary input and transmit the steering angle to the vehicle computer 110.

Next, in a block 430, the vehicle computer 110 actuates vehicle components 125 to move the vehicle 105 based on the substantially continuous rotary input. For example, the vehicle computer 110 is programmed to actuate the steering component 125 to turn the vehicle 105 based on the steering input. In these circumstances, the vehicle computer 110 compares the radius of the substantially continuous rotary input to a threshold. When the radius of the substantially continuous rotary input is less than the threshold, the vehicle computer 110 actuates the steering component 125 to the straight position, e.g., to move the vehicle 105 along a substantially straight path. When the radius of the substantially continuous rotary input is greater than the threshold, the vehicle computer 110 actuates the steering component 125 to turn the vehicle 105. In these circumstances, the vehicle computer 110 actuates the steering component 125 to one of the left-turn position or the right-turn position, e.g., to turn the vehicle 105 in the same direction as the rotational direction of the substantially continuous rotary input.

Additionally, the vehicle computer 110 is programmed to actuate a transmission component 125. For example, the vehicle computer 110 actuates the transmission controller to engage the transmission component 125 in one of a drive gear or a reverse gear, e.g., based on a gear selector 155. In these circumstances, the user can select one of a drive gear and a reverse gear via the gear selector 155, which is displayed on the touchscreen 145 when the vehicle 105 is stopped. The vehicle 105 can be propelled forward when the transmission component 125 is in the drive gear, and the vehicle 105 can be propelled backwards when the transmission component 125 is in the reverse gear.

Further, the vehicle computer 110 is programmed actuate a propulsion component 125. For example, the vehicle computer 110 actuates the propulsion component to operate the vehicle 105 at a vehicle speed, e.g., based on at least one of a speed selector 160 and a trailer angle. In these circumstances, the user can select a vehicle speed, as discussed above, via the speed selector 160, which is displayed on the touchscreen 145 when the vehicle 105 is stopped. Additionally, the vehicle computer 110 is programmed to operate the vehicle 105 at a vehicle speed based on the trailer angle. The vehicle computer 110 receives the trailer angle from the trailer sensor 115 and compares the trailer angle to a threshold. When the trailer angle is below the threshold, the vehicle computer 110 is programmed to operate the vehicle 105 at a vehicle speed at or below an upper speed limit. When the trailer angle is below the threshold, the vehicle computer 110 is programmed to operate the vehicle 105 at a vehicle speed at or below a lower speed limit.

Next, in a decision block 435, the vehicle computer 110 determines whether the speed of the rotary input is above a threshold. For example, the vehicle computer 110 compares the speed of the rotary input to the threshold. When the speed of the rotary input is above the threshold, the vehicle computer 110 determines the rotary input is a substantially continuous rotary input. When the speed of the rotary input is below the threshold, the vehicle computer 110 determines the rotary input is a discontinuous rotary input. Alternatively, the portable device 140 can compare the speed of the rotary input to the threshold and transmit a message to the vehicle computer 110 identifying whether the rotary input is a substantially continuous rotary input or a discontinuous rotary input. If the speed of the rotary input is above the threshold, then the process 400 returns to the block 425. Otherwise, the process 400 continues in a decision block 440.

In the decision block 440, the vehicle computer 110 determines whether a timer has expired. The timer, as explained above, is activated when the speed of the rotary input is below the threshold. The timer begins when the speed of the rotary input decreases below the threshold. The vehicle computer 110 can determine the speed of the rotary input increases above the threshold prior to the expiration of the timer. In these circumstances, the user can increase the speed of the rotary input prior to the expiration of the timer. When the speed of the rotary input increases above the threshold prior to the expiration of the timer, the vehicle computer 110 determines the rotary input is a substantially continuous rotary input. If the speed of the rotary input remains below the threshold when the timer expires, then the vehicle computer 110 determines the rotary input is a discontinuous rotary input. Alternatively, the timer can be in the portable device 140. For example, a processor of the portable device 140 can be programmed to determine that the speed of the rotary input increases above the threshold prior to the expiration of the timer. If the speed of the rotary input increases above the threshold prior to the expiration of the timer, then the process 400 returns to the block 425. Otherwise, the process 400 continues to a block 445.

In the block 445, the vehicle computer 110 actuates vehicle components 125 to stop the vehicle 105. For example, the vehicle computer 110 is programmed to actuate a brake controller to engage a brake component 125 to reduce the vehicle speed until the vehicle 105 stops. Additionally, the vehicle computer 110 is programmed to actuate the steering component 125 to operate in the straight position. The process ends following the block 445.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   detecting a continuous rotary input on a touchscreen of a portable device in communication with a vehicle;
   determining a steering angle and a steering direction based on a radius and a rotational direction of the continuous rotary input;
   actuating a steering component of the vehicle based on the steering angle and the steering direction; and
   actuating a propulsion component of the vehicle based on detecting a speed of the continuous rotary input above a threshold.

2. The method of claim 1, further comprising, upon detecting the vehicle is stopped, displaying at least one of a gear selector and a speed selector on the touchscreen.

3. The method of claim 1, further comprising operating the vehicle at a vehicle speed based on the speed of the continuous rotary input.

4. The method of claim 1, further comprising operating the vehicle at a vehicle speed below an upper speed limit.

5. The method of claim 1, further comprising operating the vehicle at a vehicle speed below a lower speed limit based on detecting a trailer angle above a threshold.

6. The method of claim 1, further comprising actuating a brake component of the vehicle based on detecting the speed of the continuous rotary input below the threshold.

7. The method of claim 1, wherein the speed of the continuous rotary input is determined by one of an angular velocity and a tangential velocity.

8. The method of claim 1, further comprising operating the vehicle along a straight path based on one of detecting the steering angle below a radius threshold, detecting a button pressed on the portable device, and detecting a continuous non-rotary input.

9. The method of claim 1, further comprising displaying an indicator on the touchscreen based on the steering angle and the steering direction of the continuous rotary input.

10. A system, comprising a computer including a processor and a memory, the memory storing instructions executable by the processor to:
    detect a continuous rotary input on a touchscreen of a portable device in communication with a vehicle;
    determine a steering angle and a steering direction based on a radius and a rotational direction of the continuous rotary input;
    actuate a steering component of the vehicle based on the steering angle and the steering direction; and
    actuate a propulsion component of the vehicle based on detecting a speed of the continuous rotary input above a threshold.

11. The system of claim 10, wherein the instructions further include instructions to, upon detecting the vehicle is stopped, display at least one of a gear selector and a speed selector on the touchscreen.

12. The system of claim 10, wherein the instructions further include instructions to operate the vehicle at a vehicle speed based on the speed of the continuous rotary input.

13. The system of claim 10, wherein the instructions further include instructions to operate the vehicle at a vehicle speed below an upper speed limit.

14. The system of claim 10, wherein the instructions further include instructions to operate the vehicle at a vehicle speed below a lower speed limit based on detecting a trailer angle above a threshold.

15. The system of claim 10, wherein the instructions further include instructions to actuate a brake component of the vehicle based on detecting the speed of the continuous rotary input below the threshold.

16. The system of claim 10, wherein the speed of the continuous rotary input is determined by one of an angular velocity and a tangential velocity.

17. The system of claim 10, wherein the instructions further include instructions to operate the vehicle along a straight path based on one of detecting the steering angle below a radius threshold, detecting a button pressed on the portable device, and detecting a continuous non-rotary input.

18. The system of claim 10, wherein the instructions further include instructions to display an indicator on the touchscreen based on the steering angle and the steering direction of the continuous rotary input.

19. A system, comprising a computer including a processor and a memory, the memory storing instructions executable by the processor to:
    detect a continuous rotary input on a touchscreen of a portable device in communication with a vehicle;
    determine a steering angle and a steering direction based on a radius and a rotational direction of the continuous rotary input;
    actuate a steering component of the vehicle based on the steering angle and the steering direction; and
    operate the vehicle along a straight path based on one of detecting the steering angle below a radius threshold, detecting a button pressed on the portable device, and detecting a continuous non-rotary input.

* * * * *